(12) United States Patent
Laughlin et al.

(10) Patent No.: US 9,929,854 B2
(45) Date of Patent: Mar. 27, 2018

(54) DUPLEXING APPARATUS, WIRELESS DEVICES AND RELATED METHODS

(71) Applicant: u-blox AG, Thalwil (CH)

(72) Inventors: Leo Laughlin, Bristol (GB); Christopher Marshall, Reigate (GB)

(73) Assignee: uBlox AG, Thalwil (CH)

( * ) Notice: Subject to any disclaimer, the term of this patent is extended or adjusted under 35 U.S.C. 154(b) by 78 days.

(21) Appl. No.: 14/614,371

(22) Filed: Feb. 4, 2015

(65) Prior Publication Data

US 2015/0222412 A1 Aug. 6, 2015

(30) Foreign Application Priority Data

Feb. 4, 2014 (EP) ..................................... 14153891

(51) Int. Cl.
*H04W 24/08* (2009.01)
*H03H 7/46* (2006.01)
*H04L 5/14* (2006.01)
*H04W 72/04* (2009.01)
*H04B 1/525* (2015.01)
*H04B 1/58* (2006.01)

(52) U.S. Cl.
CPC ........... *H04L 5/1438* (2013.01); *H04B 1/525* (2013.01); *H04B 1/581* (2013.01); *H04W 24/08* (2013.01); *H04W 72/0453* (2013.01)

(58) Field of Classification Search
CPC .................................. H04H 7/468; H04L 5/14
USPC ..................................... 370/276; 455/107, 83
See application file for complete search history.

(56) References Cited

U.S. PATENT DOCUMENTS

| 8,351,874 | B2 | 1/2013 | Dent et al. | |
| 8,897,722 | B2 | 11/2014 | Mikhemar et al. | |
| 8,971,219 | B2 | 3/2015 | Choksi | |
| 2013/0258911 | A1* | 10/2013 | Choksi | ......... H03H 7/09 370/277 |
| 2013/0335291 | A1* | 12/2013 | Judson | ......... H01Q 1/50 343/861 |
| 2017/0230076 | A1* | 8/2017 | Sjoland | ......... H04B 1/582 |

OTHER PUBLICATIONS

Abelhalem Sherif et al "Hybrid transformer-based tunable integrated duplexer with antenna impedence tracking loop", Proceedings of the IEE 2013 Custom Integrated Circuits Conference, IEEE Sep. 22, 2013 pp. 1-4.*
European Search Report for corresponding European Patent Application No. 14153891.8, 8 pp., (dated Mar. 13, 2014).
M. Mikhemar, et al., "A Tunable Integrated Duplexer with 50dB Isolation in 40nm CMOS", 2009 IEEE International Solid-State Circuits Conference (ISSCC 2009), Session 22, PA and Antenna Interface, 22.7, pp. 386-388, (Feb. 11, 2009).

(Continued)

*Primary Examiner* — Asad Nawaz
*Assistant Examiner* — Jason Harley
(74) *Attorney, Agent, or Firm* — Womble Bond Dickinson (US) LLP

(57) ABSTRACT

The invention provides duplexing apparatus, wireless devices and methods for duplexing signals in which measurements are taken at multiple frequencies across a frequency band of interest, and in which a balancing impedance is controlled as a function of those measurements. Isolation between the RX and TX nodes is enhanced across the frequency band as a result.

22 Claims, 4 Drawing Sheets

(56) References Cited

OTHER PUBLICATIONS

Pekka Pursula, et al., "Hybrid Transformer-Based Adaptive RF Front End for UHF RFID Mobile Phone Readers", 2008 IEEE International Conference on RFID, The Venetian, Las Vegas, Nevada, USA, pp. 150-155, (Apr. 16-17, 2008).

Sherif H. Abdelhalem, et al., "Hybrid Transformer-Based Tunable Differential Duplexer in a 90-nm CMOS Process", IEEE Transactions on Microwave Theory and Techniques, vol. 61, No. 3, pp. 1316-1326, (Mar. 2013).

Sherif H. Abdelhalem, et al., "Hybrid Transformer-Based Tunable Integrated Duplexer with Antenna Impedance Tracking Loop", Proceedings of the IEEE 2013 Custom Integrated Circuits Conference, pp. 1-4, (Sep. 22, 2013).

Mohyee Mikhemar, et al., "A Multiband RF Antenna Duplexer on CMOS: Design and Performance", IEEE Journal of Solid-State Circuits, vol. 48, No. 9, pp. 2067-2077, (Sep. 2013).

K. R. Boyle, et al., "A Self-Contained Adaptive Antenna Tuner for Mobile Phones", 6th European Conference on Antennas and Propagation (EUCAP), pp. 1804-1808, (2011).

\* cited by examiner

DUPLEXING APPARATUS, WIRELESS DEVICES AND RELATED METHODS

TECHNICAL FIELD

The present invention relates to wireless systems, and particularly to duplexing apparatus, wireless devices comprising such apparatus, and methods for isolating transmit and receive signals from each other.

BACKGROUND

Wireless communication systems are fundamentally limited by the availability of the electromagnetic spectrum in which they must operate. Consequently, increasing spectral efficiency has been a major focus of research over recent decades, and given the exponential growth in demand for radio services, spectral efficiency will continue as a key research driver for years to come. Radio signals attenuate quickly with distance, and therefore in radio systems the transmit signal powers are typically much higher than receive signal powers (often over 100 dB higher in cellular systems). Because of this, it has long been held that a radio system cannot transmit and receive on the same frequency at the same time, as the high powered transmit signal would lead to catastrophic self-interference at the receiver.

In conventional radio systems, duplex operation is achieved by simply avoiding this problem. Spectral resources are divided between the transmit and receive channels either in time, using time division duplexing (TDD), or frequency, using frequency division duplexing (FDD).

In FDD radio operation, there are two separate carriers at different frequencies, one for the uplink transmission and one for the downlink transmission. Isolation between the downlink and uplink transmissions is achieved by transmission/reception filters called duplex filters. Otherwise known as duplexers, these duplex filters are typically implemented as two highly selective filters, one centred at the receive (RX) band, the other centred at the transmit (TX) band to separate the TX and RX signals, thereby preventing the TX signal from interfering with the RX function.

The achievable TX-RX isolation of a duplexer is of primary concern, since a higher duplexer isolation simultaneously relaxes the noise requirements of the transmitter and the linearity plus phase-noise requirements of the receiver. For example, certain cellular radio standards dictate a TX-RX isolation of 52 dB in the TX band and 45 dB in the RX band. These stringent isolation requirements are met in modern duplexers by employing highly selective surface acoustic wave (SAW) filters.

These filters must be implemented off-chip (i.e. they cannot be integrated with a CMOS process) owing to the high-Q resonators used to build the SAW filters. This usually presents no problems for a simple radio transceiver operating on one frequency band. However, modern radio transceivers are usually multiband. For example, there are 38 operating bands for LTE (Long-Term Evolution) as defined by the 11th Release of the Third Generation Partnership Project (3GPP Rel. 11), 26 of which require FDD operation.

This means a separate duplexer is required for each band of operation. The 'bank' of discrete duplexers is usually connected to the antenna via a multipole RF switch, which selects the appropriate duplexer based on the frequency band of operation. Not only does this add to the complexity of the device, it also impacts the overall size and cost of the multiband transceiver which relies on a highly integrated solution for economies of scale. Consequently, a duplexing apparatus is highly desired which can not only support multiple bands, but which can also be fully integrated on-chip.

SUMMARY OF INVENTION

According to a first aspect of the present invention, there is provided an apparatus for duplexing signals to be transmitted wirelessly and signals received wirelessly by an antenna, comprising: a hybrid junction comprising an antenna node for coupling to the antenna, an input node for receiving a signal to be transmitted by the antenna, an output node for outputting a signal received wirelessly by the antenna, and a balancing node; a variable impedance coupled to the balancing node; and a controller arranged to: a) set the variable impedance to a predetermined impedance; b) transmit a signal at a first frequency in a first frequency band of interest; c) measure a signal at the output node at at least one second frequency in a second frequency band of interest as a result of the signal transmitted at the first frequency; d) repeat steps b) and/or step c) for at least one other frequency in the first frequency band of interest and/or at least one other frequency in the second frequency band of interest; and e) control the variable impedance as a function of the measurements in step c).

In embodiments of the invention, the first frequency band of interest and the second frequency band of interest may either not overlap, overlap partially or overlap completely. The bands may therefore be the same (i.e. the system may transmit and receive signals over the same frequency band in a full duplex mode) or different. If different, the transmission and reception bands may be adjacent to one another in frequency space.

In embodiments of the invention, the first frequency and the at least one second frequency may be identical, or they may be different.

In embodiments of the invention, the controller is arranged to, for each signal measured at the output node measurement in step c), calculate respective quantities representing interference and balance of the hybrid junction using the signal; and control the variable impedance as a function of the plurality of quantities. In one embodiment, the controller is arranged to control the variable impedance such that a reflection coefficient at the balancing node is proportional to the mean reflection coefficient of the antenna over the first or second frequency band of interest. In another embodiment, the controller is arranged to control the variable impedance further as a function of at least one of a power density with which signals are transmitted by the antenna as a function of frequency, and a filter gain with which signals are received as a function of frequency.

In embodiments of the invention, the controller is arranged to control the variable impedance to take an impedance proportional to $$\frac{1 + k\overline{\Gamma_{ANT}(\omega)}}{1 - k\overline{\Gamma_{ANT}(\omega)}},$$

where $\overline{\Gamma_{ANT}(\omega)}$ is the mean reflection coefficient of the antenna over the first or second frequency band of interest, and where k is a constant of proportionality.

According to a second aspect of the present invention, there is provided a method of duplexing signals to be transmitted wirelessly and signals received wirelessly by an antenna, in a system comprising a hybrid junction, the hybrid junction comprising an antenna node for coupling to the antenna, an input node for receiving a signal to be transmitted by the antenna, an output node for outputting a signal received wirelessly by the antenna, and a balancing node, the method comprising: a) setting a variable impedance coupled to the balancing node to a predetermined impedance; b) transmitting a signal at a first frequency in a first frequency band of interest; c) measuring a signal at the output node at at least one second frequency in a second frequency band of interest as a result of the signal transmitted at the first frequency; d) repeating steps b) and/or step c) for at least one other frequency in the first frequency band of interest and/or at least one other frequency in the second frequency band of interest; and e) controlling the variable impedance as a function of the measurements in step c).

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 1:
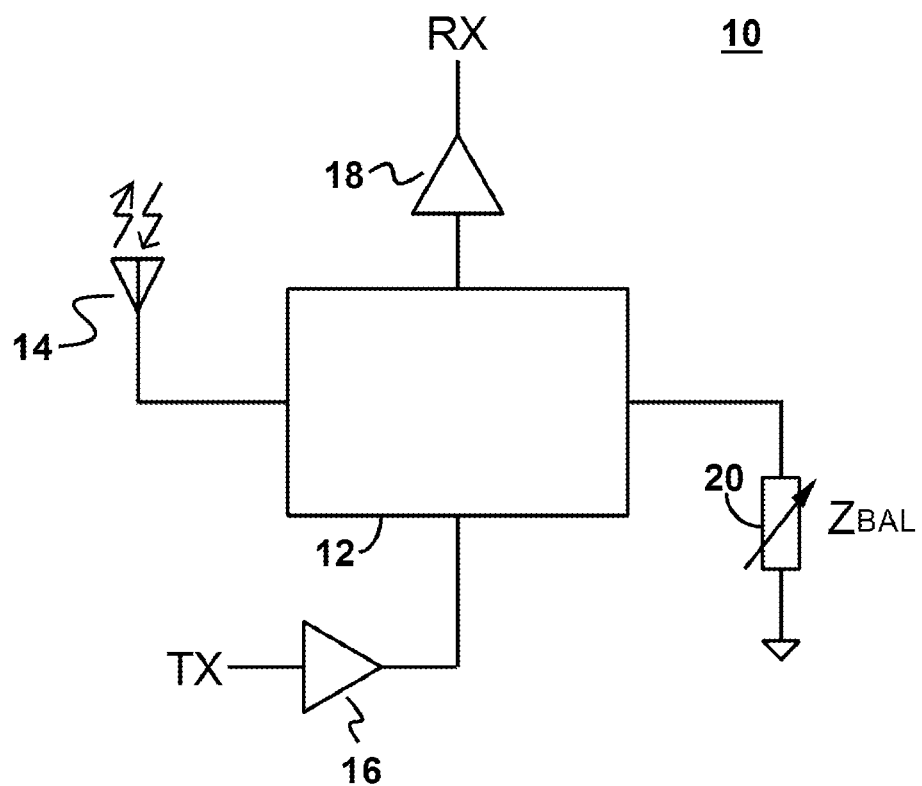
FIG. 1 is a schematic drawing showing a duplexing apparatus according to embodiments of the present invention.

FIG. 1 shows a duplexing apparatus 10 according to embodiments of the invention.

The apparatus comprises a hybrid circuit 12 (also known as a hybrid junction) with at least four nodes. A first node is coupled to an antenna 14 for receiving and transmitting signals wirelessly. A second node is coupled to a transmit (TX) path. Thus, signals to be transmitted are input to the hybrid circuit 12 via a power amplifier 16; the signals are then passed to the antenna 14. A third node is coupled to a receive (RX) path. Thus, signals received wirelessly via the antenna 14 are passed through the hybrid circuit 12 to a low-noise amplifier (LNA) 18 in the RX path. A fourth node is coupled to a variable impedance $Z_{BAL}$ 20, also termed a balancing impedance. The balancing impedance may comprise a network of variable resistors, inductors and/or capacitors. The resistors, inductors and/or capacitors may be varied to take different respective resistances, inductances and capacitances, and the manner of the coupling between them can be varied in a known manner such that the variable impedance 20 takes an overall desired impedance. The components and coupling may further be arranged to present a desired variation of impedance over a range of frequencies.

In the schematic arrangement of FIG. 1, the first node (also termed "the antenna node") is arranged opposite the fourth node (also termed "the balancing node"), while the second node ("the TX node") is arranged opposite the third node ("the RX node"). It will be apparent to those skilled in the art that, according to the particular topology chosen for the hybrid circuit, each node may comprise one or two terminals. Some embodiments may however include more than two terminals dependent on the implementation.

As will be known to those skilled in the art, the hybrid circuit 12 may be a transformer, network of resistors, set of wave-guides or other arrangement, configured to provide four terminals (or pairs of terminals for differential signals). Hybrid circuits have the property that when the circuit is balanced, a signal entering at one terminal divides and emerges from the two adjacent terminals, but is unable to reach the opposite terminal. To achieve such isolation at a particular terminal, the impedances seen at the terminals adjacent to the particular terminal should be appropriately valued, such that the reflections coefficients at the antenna node and the balancing node are related by a constant factor which depends on the symmetry of the particular hybrid in question, i.e. balanced. In some hybrid circuit topologies, the impedances seen at the terminals adjacent to the particular terminal may be equal; in others, not.

Figures 2A, 2B, 2C:
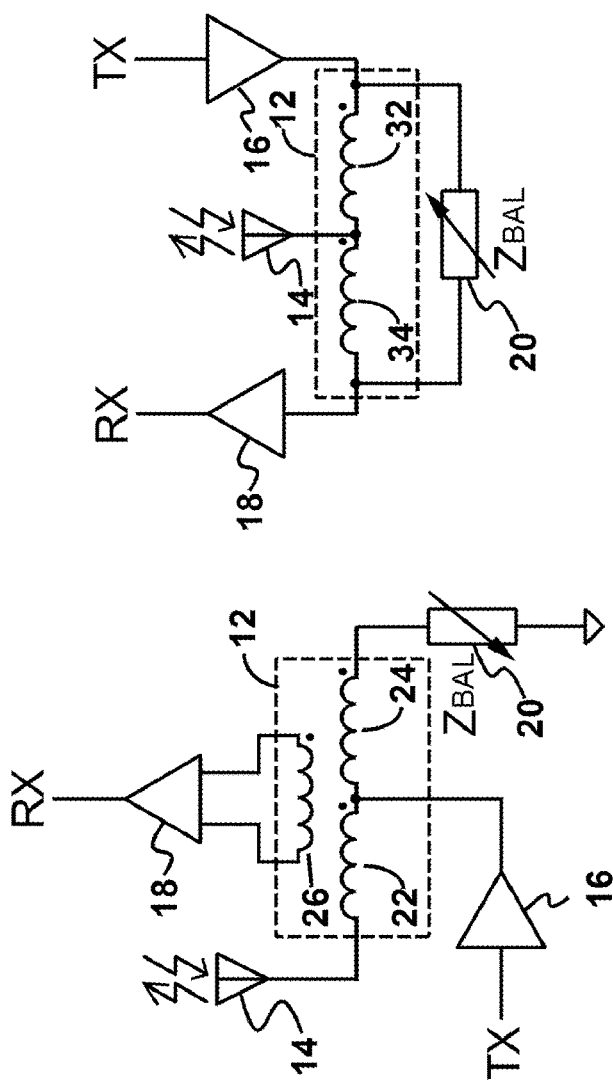
FIGS. 2a to 2c are examples of hybrid circuits which may be employed in a duplexing apparatus according to embodiments of the present invention.

FIGS. 2a to 2c show three different implementations of the hybrid circuit 12. Those skilled in the art will appreciate that the circuits shown are examples and alternative circuits could be employed which achieve the same isolating effect without departing from the scope of the invention.

FIG. 2a shows a first circuit implementation, in which the TX node (i.e. the output of the power amplifier 16) is connected between two inductors 22, 24. An opposing terminal of the first inductor 22 is coupled to the antenna node (i.e. to the antenna 14), while an opposing terminal of the second inductor 24 is coupled to the balancing node (i.e. to one terminal of the balancing impedance 20). The other terminal of the balancing impedance 20 is coupled to a reference potential. A third inductor 26 is inductively coupled to both the first and second inductors 22, 24, with the terminals of the third inductor 26 both coupled to the RX node (i.e. to the low-noise amplifier 18).

FIG. 2b shows a second circuit implementation of the hybrid circuit 12, in which the TX node is connected to one terminal of an inductor 32, with the opposite terminal being coupled to the antenna 14. The RX node is coupled to one terminal of a second inductor 34, with the opposing terminal also coupled to the antenna 14. The balancing impedance 20 is connected across the two serially connected inductors 32, 34, such that the balancing impedance 20 is coupled at one end to the RX node, and at the other end to the TX node. In this example, therefore, the balancing node comprises two terminals at either end of the balancing impedance 20.

FIG. 2c shows a third circuit implementation of the hybrid circuit 12, in which the TX node is coupled to one terminal of an inductor 42, with the opposite terminal coupled to the balancing impedance 20. The RX node is coupled to one terminal of a second inductor 44, with the opposite terminal also coupled to the balancing impedance (at the same node thereof). A third inductor 46 is inductively coupled to the first and second inductors 42, 44, with one terminal of the inductor 46 being coupled to the antenna 14, and the other terminal coupled to a reference potential (e.g. ground).

Once correctly balanced, all of these circuit implementations operate to isolate signals at the RX node from reaching the TX node and vice versa. Those skilled in the art will appreciate that alternative circuits may be provided which achieve the same effect.

Thus, by appropriately controlling the balancing impedance 20, a signal entering the hybrid circuit 12 at the TX node can be seen at the balancing impedance 20 and the antenna 14 (and can thus be transmitted via the antenna), but ideally not at the RX node. Isolation between the TX and RX paths can be obtained and interference arising from the RX signal at the TX node eliminated. In theory this will occur when the balancing impedance is perfectly matched to the antenna impedance (for a symmetrical hybrid) or proportionally related (for an asymmetrical hybrid).

Achieving good isolation using this technique requires a good balance between the reflection coefficient seen at the antenna node (which is dependent on the impedance of the antenna), and the reflection coefficient seen at the balancing node (which is dependent on the impedance of the variable impedance 20). However, the antenna impedance is seldom fixed to a constant value, rather it is: (1) a function of frequency and thus will vary across the frequency band of operation; (2) heavily influenced by the environment in which it is placed due to variation in surroundings and human interaction, making it time variant also. These effects will ultimately degrade the amount of isolation achieved in practice, and this is particularly the case in cellular applications where relatively wide frequency bands are used and the end-user is frequently mobile.

Embodiments of the present invention address these problems by setting the variable impedance to a known impedance and transmitting a signal via the antenna 14 at a known frequency within the frequency band. The signal which appears at the RX node as a result of the imperfect isolation in the hybrid circuit 12 is measured. This process is repeated for multiple frequencies within the frequency band, and the variable impedance 20 can then be adjusted on the basis of the signals measured at the RX node. Thus, by measuring the signal at the RX node for multiple different frequencies across the frequency band, the variation of antenna impedance with frequency can be taken into account and compensated for. Ultimately, the TX-RX gain over the frequency band (i.e. the extent to which the TX signal is seen at the RX node and vice versa) should be reduced and, ideally, minimized.

Figure 3:
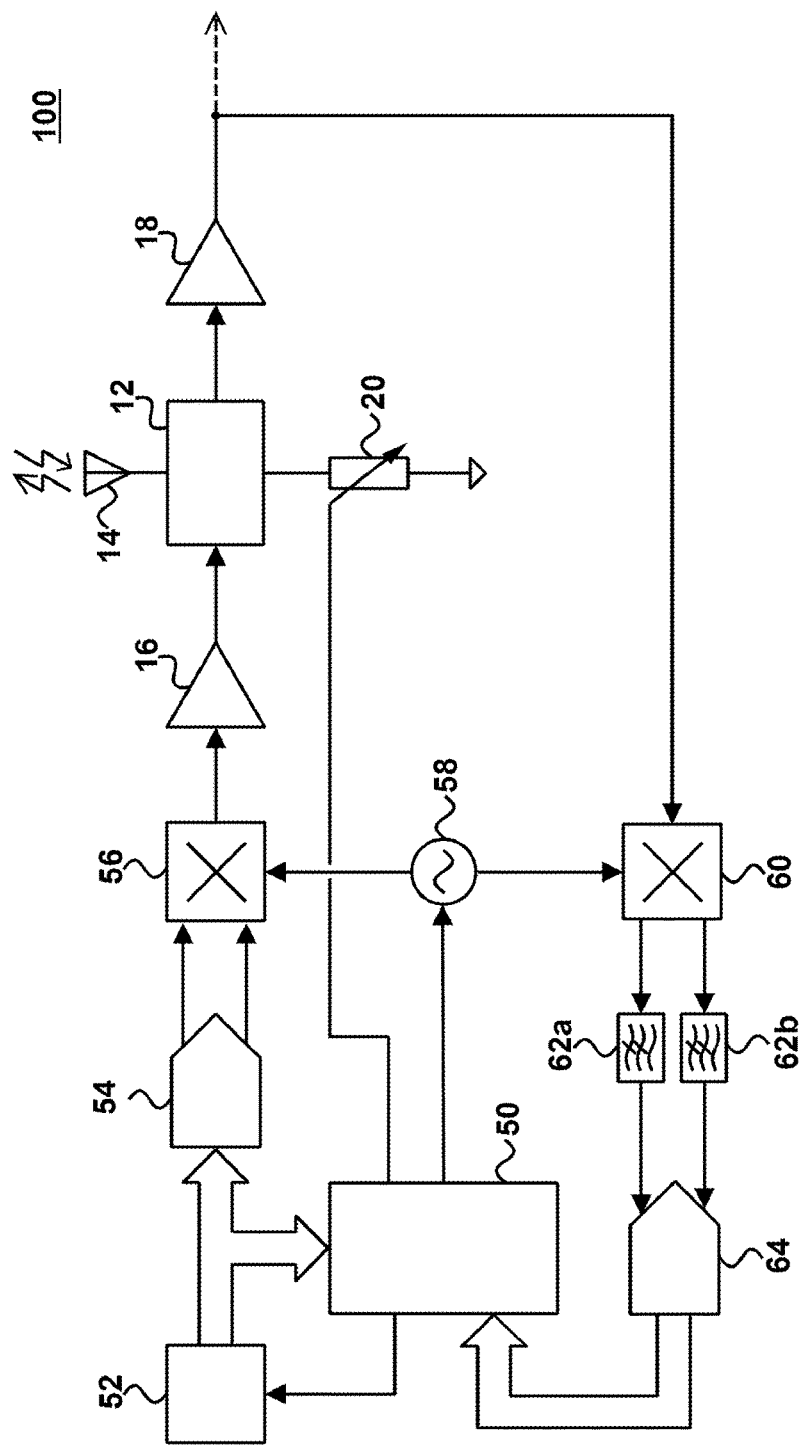
FIG. 3 shows a wireless device comprising a duplexing apparatus according to embodiments of the present invention.

FIG. 3 shows in more detail a wireless device 100 employing a duplexing apparatus as described above. Similar components are denoted with similar reference numerals to avoid unnecessary repetition.

The device comprises a processor 50 (e.g., a microprocessor), which controls the device 100 generally, and particularly controls the duplexing operation in a manner described in more detail below.

The device comprises a TX path which will be familiar to those skilled in the art. A baseband processor 52 communicates with the processor 50. The processor 50 and/or the baseband processor may have access to a memory (not illustrated) which stores information to be transmitted by the wireless device 10, or information which has been received by the wireless device 10.

The baseband processor 52 generates one or more output signals to be transmitted by the device 10. In the illustrated embodiment these signals are digital, and expressed in two components to be modulated together for transmission: a quadrature component (Q) and an in-phase component (I). Those skilled in the art will appreciate that alternative modulation schemes are possible.

The signals output from the base band processor 52 are input to a digital-to-analogue converter (DAC) 54, and converted to the analogue domain. The signals output from the base band processor 52 may also be input to the processor 50 to provide any necessary feedback. The analogue signals are converted to radio frequency in a mixer 56, by mixing with radio frequency signals generated by a local oscillator 58 under the control of the processor 50, and input to the power amplifier 16 for amplification prior to transmission via the hybrid circuit 12 and the antenna 14 as described above.

The device 100 further comprises an RX path which, again, will be familiar to those skilled in the art. Signals received by antenna 14 are coupled to the low-noise amplifier 18 (and not the power amplifier 16) via the hybrid circuit 12. The RX path illustrated in FIG. 3 is for the purpose of calibrating the duplexing operation of the hybrid circuit. Thus, in general, the received signals may also be output to a memory or some other RX path in the device (illustrated by the hashed line in FIG. 3) to be processed in the usual way. The illustrated RX path comprises a second mixer 60, which receives the output of low-noise amplifier 18 as well as the radio-frequency signals from the local oscillator 58, and downconverts the received signal to the baseband. Alternatively, the second mixer 60 could be connected to the input of the low-noise amplifier 18, receiving the signal from the hybrid circuit 12 directly. In the illustrated embodiment, the received signals are demodulated into I and Q components, but alternative demodulation schemes will be apparent to those skilled in the art. The I and Q (analogue) received signals are input respectively to low-pass filters 62a, 62b, and further to an analogue-to-digital converter (ADC) 64. The digital signals are then provided to the processor 50 for processing in a manner to be described below.

The Tx-Rx voltage gain $G_{TX-RX}$ of the hybrid circuit 12, with an ideal symmetrical topology, is given by $$G_{TX-RX} = \tfrac{1}{2}|\Gamma_{BAL}(\omega) - \Gamma_{ANT}(\omega)|$$

where $\Gamma_{BAL}(\omega)$ is the reflection coefficient of the balancing node, and $\Gamma_{ANT}(\omega)$ is the reflection coefficient of the antenna node. To obtain $\Gamma_{ANT}$, one can measure $G_{TX-RX}$ and solve for $\Gamma_{ANT}(\omega)$.

In reality, however, the hybrid circuit is not ideal or symmetrical, and the gain is in fact given by $$G_{TX-RX}(\omega) = X(\omega)\Gamma_{BAL}(\omega) - Y(\omega)\Gamma_{ANT}(\omega) + Z(\omega)$$

where $X(\omega)$ and $Y(\omega)$ are frequency-dependent variables which depend on the symmetry and losses of the hybrid in the balancing node and the antenna node respectively (referred to as the balancing channel and the antenna channel respectively), and $Z(\omega)$ is a direct leakage path through the hybrid circuit, from the TX node to the RX node. In the ideal symmetrical case, $X(\omega) = Y(\omega) = \tfrac{1}{2}$ and $Z(\omega) = 0$. In the non-ideal case there are four unknowns: $X(\omega)$, $Y(\omega)$, $Z(\omega)$, and $\Gamma_{ANT}(\omega)$. In some embodiments is varied to take different appropriately chosen known values thus constructing a system of simultaneous equations. For example, in one embodiment where $X(\omega) = Y(\omega) = L(\omega)$, we can measure the transmit to receive gain for two known impedances and create a system of equations as follows:

$$G_{TX-RX_1}(\omega) = L(\omega)|\Gamma_{BAL_1}(\omega) - \Gamma_{ANT}(\omega)|$$

$$G_{TX-RX_2}(\omega) = L(\omega)|\Gamma_{BAL_2}(\omega) - \Gamma_{ANT}(\omega)|$$

where $\Gamma_{BAL_1}(\omega)$ and $\Gamma_{BAL_2}(\omega)$ are the known balancing reflection coefficients. This can be solved to obtain $\Gamma_{ANT}(\omega)$ and $L(\omega)$.

However, since in some embodiments $X(\omega) \ne Y(\omega)$, and/or $Z(\omega) \ne 0$, it may not be possible to obtain $Y(\omega)$, $\Gamma_{ANT}$ or $Z(\omega)$ because, although consistent, the resulting system of equations is underdetermined. In these conditions only $X(\omega)$ can be obtained unequivocally.

However, in some embodiments it may not be necessary to solve for all variables. Rather, we may substitute $I(\omega)=Y(\omega)\Gamma_{ANT}(\omega)+Z(\omega)$ and construct a system of equations such that $$G_{TX-RX}(\omega)=X(\omega)\Gamma_{BAL_1}(\omega)-I(\omega)$$

$$G_{TX-RX}(\omega)=X(\omega)\Gamma_{BAL_2}(\omega)-I(\omega)$$

which is fully determined and can be solved for $X(\omega)$ and $I(\omega)$. $I(\omega)$ represents the interference which is due to reflection at the antenna port and direct coupling between the TX and RX nodes of the hybrid circuit 12 (referred to as the interference channel).

Figure 4:
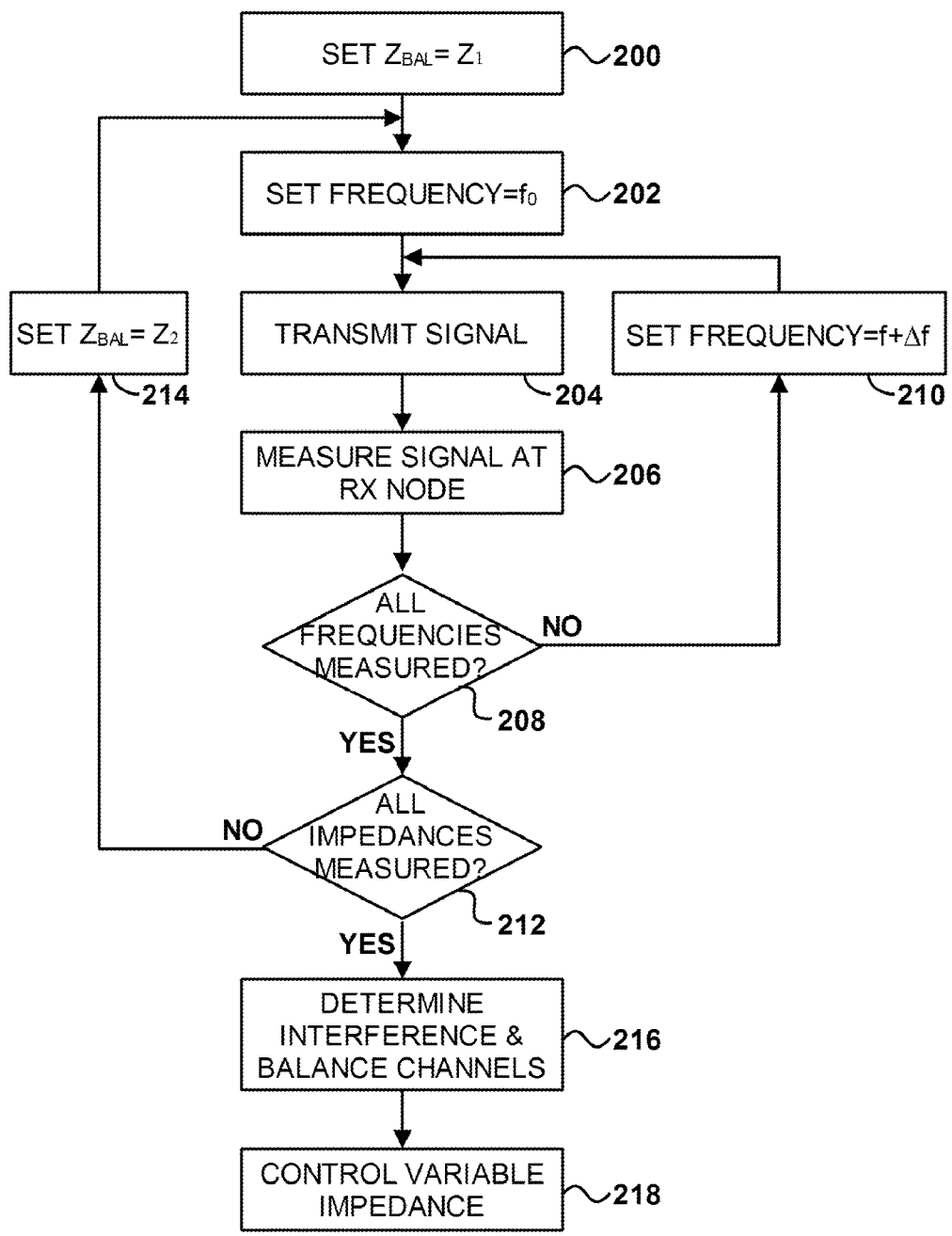
FIG. 4 shows a flow chart of a method according to embodiments of the present invention.

FIG. 4 is a flow chart of a method in accordance with embodiments of the present invention.

The method begins in step 200, where the processor 50 controls the balancing impedance 20 to take a particular known impedance, $Z_1$. This impedance may be 50 ohms, for example. In step 202, the processor 50 further controls the local oscillator 58 to oscillate at a frequency such that signals are transmitted via the antenna 14 at a first frequency $f_0$ within a frequency band of interest. The frequency band of interest may be a transmit band, for example.

In step 204, a signal is transmitted at the frequency $f_0$, via the power amplifier 16, the hybrid circuit 12 and the antenna 14. As this happens, in step 206 the signal arising at the RX node (owing to imperfect isolation by the hybrid circuit 12) is measured using the RX path described above with respect to FIG. 3. The measured signal can be stored in a memory, for example. The measurement takes place over a second frequency band of interest, which may be a receive band, for example. The first and second frequency bands of interest may be entirely different (i.e. they do not overlap at all), or may overlap partially. In one embodiment, the first and second frequency bands of interest may overlap entirely (i.e. one band falls entirely within the other band) or be identical. In the latter case, the device can be described as operating in a "full duplex" mode.

In step 208, it is determined whether signals have been measured for all required frequencies in the frequency band of interest. If not, the frequency of the local oscillator 58 is altered (for example by an increment frequency $\Delta f$) in step 210 and the process reverts to step 204. A further signal is transmitted at the new frequency, and the signal arising at the RX node is measured. This process repeats at least once, such that measurements are taken for at least two frequencies in the frequency band of interest. In embodiments of the invention, however, more than two measurements may be taken at more than two different frequencies across the band. In one embodiment the different frequencies may be uniformly spaced across the band; in other embodiments, the spacing may be arbitrary.

Once it is determined, in step 208, that measurements have been taken at the multiple required frequencies, the process moves to step 212 in which it is determined whether measurements have been taken at multiple impedances. That is, in some embodiments it may be necessary to take multiple measurements at the same frequency, using different known impedances as the balancing impedance 20. If measurements have been taken using only one impedance, for example, the process may move to step 214 in which the balancing impedance 20 is changed to a second, different, known impedance $Z_2$. Steps 202, 204, 206, 208 and 210 are all repeated, using the same frequencies, for the new impedance $Z_2$. In some embodiments, where the hybrid is near ideal and has known symmetry the process may not need to be repeated for a second impedance. In other embodiments the process may be repeated for more than two impedances.

Those skilled in the art will appreciate that alterations may be made to the method illustrated in FIG. 4 without substantially affecting the operation of the invention. For example, where FIG. 4 describes acquiring multiple measurements at different frequencies before changing the balancing impedance, the method may instead acquire multiple measurements at the same frequency but different balancing impedances, before changing the frequency of transmission. In either case, the same data is acquired.

Once that data is acquired, the process moves to step 216, in which the values of the interference channel $I(\omega)$ and the balancing channel $X(\omega)$ are calculated for each frequency across the frequency band, using the signals measured at the RX node (given that the processor 50 knows what signal was transmitted—see the feedback between the baseband processor 52 and the processor 50—and the value of the balancing impedance at the time of transmission). In step 218, the variable impedance 20 is set for operation on the basis of this information.

There are many ways in which the variable impedance may be controlled on the basis of the measured signals and on the basis of the calculated channels.

In one embodiment, the processor 50 may calculate the mean average of the interference channel and of the balancing channel across the frequency band of interest, and control the balancing impedance such that the reflection coefficient of the impedance is equal to the mean of the interference channel over the frequency band of interest divided by the balancing channel. For example, particularly where the variation with frequency of the impedance reflection coefficient can be considered small or zero, it can be shown that the balancing impedance which minimizes the TX-RX gain at the hybrid circuit 12 is that which occurs when the balancing reflection coefficient equals the mean of the interference channel across the frequency band of interest, divided by the mean of the balancing channel across the frequency band of interest. In that case this optimum reflection coefficient, $\Gamma_{BAL\_OPT}(\omega)$, of the balancing impedance can be calculated according to the following equation:

$$\Gamma_{BAL\_OPT}(\omega) = \frac{\overline{I(\omega)}}{\overline{X(\omega)}}$$

wherein the symbols take their meanings as before and the means of these quantities are taken over the frequency bands of interest. The balancing impedance 20 may be controlled according to the following equation:

$$Z_{BAL} = R_o \frac{\Gamma_{BAL\_OPT}(\omega) - 1}{\Gamma_{BAL\_OPT}(\omega) + 1}$$

where $R_o$ is a normalizing impedance.

In other embodiments, the processor 50 may take into account the power density with which signals are to be transmitted by the antenna 14 as a function of frequency, and control the variable impedance as a function of that quantity. For example, a weighting function could be included in each case, to take into account the energy density in the transceiver as a function of frequency, as follows:

1. Inclusion of the expected normalized transmitter power density, $T(\omega)$, to take into account the variation of the power output across the transmitter band(s), and so take into account the variation of the transmitter signal power that could potentially cause interference to the receiver 2. Inclusion of the expected normalized receiver filter gain, $R(\omega)$, to take into account the variation of the power transfer function of the receiver filters across the receiver band(s), and so take into account the variation of the robustness of the receiver to potential interference by signal power from the transmitter 3. Inclusion of the expected combined transmitter power density and receiver filtering, $(T(\omega) \cdot R(\omega))$, to take both effects into account within the overlap of the transmitter and receiver band(s).

In order to account for variations in the interference channel arising from external factors (such as changes in the environment in which the antenna is placed) or internal factors (such as a change in temperature of the components) during the lifetime of the device 100, the process of optimizing the variable impedance may be repeated at opportune moments to update the variable impedance and account for such variations.

The invention thus provides duplexing apparatus, wireless devices and methods for duplexing signals in which measurements are taken at multiple frequencies across a frequency band of interest, and in which a balancing impedance is controlled as a function of those measurements. Isolation between the RX and TX nodes is enhanced and interference of the operation of the RX by the TX is reduced overall across the frequency band as a result.

Those skilled in the art will appreciate that various amendments and alterations can be made to the embodiments described above without departing from the scope of the invention as defined in the claims appended hereto.

What is claimed is:

1. An apparatus for duplexing signals to be transmitted wirelessly and signals received wirelessly by an antenna, comprising:
    a hybrid junction comprising an antenna node for coupling to the antenna, an input node for receiving a signal to be transmitted by the antenna, an output node for outputting a signal received wirelessly by the antenna, and a balancing node;
    a variable impedance coupled to the balancing node; and
    a controller arranged to:
    a) set the variable impedance to a first impedance setting;
    b) transmit a first transmit signal at a first transmit frequency in a first frequency band;
    c) measure a first signal at the output node at a first receive frequency in a second frequency band \as a result of the first signal transmitted at the first transmit frequency;
    d) select a second impedance setting of the variable impedance;
    e) transmit a second transmit signal at a second transmit frequency in the first frequency band;
    f) measure a second signal at the output node at a second receive frequency in the second frequency band as a result of the second signal transmitted at the second transmit frequency;
    g) employ a system of equations comprising variables associating the first measured signal, the second measured signal, the first impedance setting, and the second impedance setting; and
    h) determine a third impedance setting to isolate the input node from the output node of the hybrid junction using the system of equations.

2. The apparatus according to claim 1, wherein the first frequency band and the second frequency band do not overlap, overlap partially or overlap completely.

3. The apparatus according to claim 1, wherein the first transmit frequency and the first receive frequency are identical or different.

4. The apparatus according to claim 1, wherein the controller is further arranged to:
    for each measurement in operation c), calculate respective quantities representing interference and balance channels of the hybrid junction; and
    control the variable impedance as a function of the respective quantities.

5. The apparatus according to claim 1, wherein the controller is configured to control the variable impedance such that a reflection coefficient at the balancing node is proportional to a mean reflection coefficient of the antenna over the first or second frequency band.

6. The apparatus according to claim 1, wherein the controller is arranged to control the variable impedance further as a function of at least one of a power density with which signals are transmitted by the antenna as a function of frequency, and a filter gain with which signals are received as a function of frequency.

7. The apparatus according to claim 1, wherein the controller is configured to: set the variable impedance to a further impedance setting; repeat operations b) and c) for the further impedance setting in order to obtain another plurality of measurements at the output node; and control the variable impedance further as a function of the another plurality of measurements.

8. The apparatus according to claim 1, wherein the controller is configured to carry out operations a) to h) periodically.

9. The apparatus according to claim 1, wherein the controller is arranged to control the variable impedance to take an impedance proportional to $$\frac{1 + k\overline{\Gamma_{ANT}(\omega)}}{1 - k\overline{\Gamma_{ANT}(\omega)}},$$

where $\overline{\Gamma_{ANT}(\omega)}$ is the mean reflection coefficient of the antenna over the first or second frequency band, and where k is a constant of proportionality.

10. A wireless device comprising an antenna and an apparatus for duplexing signals to be transmitted wirelessly and signals received wirelessly by an antenna, comprising:
    a hybrid junction comprising an antenna node for coupling to the antenna, an input node for receiving a signal to be transmitted by the antenna, an output node for outputting a signal received wirelessly by the antenna, and a balancing node;
    a variable impedance coupled to the balancing node; and
    a controller arranged to:
    a) set the variable impedance to a first impedance setting;
    b) transmit a first transmit signal at a first transmit frequency in a first frequency band;
    c) measure a first signal at the output node at a first receive frequency in a second frequency band as a result of the first signal transmitted at the first transmit frequency;
    d) select a second impedance setting of the variable impedance;

e) transmit a second transmit signal at a second transmit frequency in the first frequency band;

f) measure a second signal at the output node at a second receive frequency in the second frequency band as a result of the second signal transmitted at the second transmit frequency;

g) employ a system of equations comprising variables associating the first measured signal, the second measured signal, the first impedance setting, and the second impedance setting; and h) determine a third impedance setting to isolate the input node from the output node of the hybrid junction using the system of equations.

11. A method of duplexing signals to be transmitted wirelessly and signals received wirelessly by an antenna, in a system comprising a hybrid junction, the hybrid junction comprising an antenna node for coupling to the antenna, an input node for receiving a signal to be transmitted by the antenna, an output node for outputting a signal received wirelessly by the antenna, a balancing node, and a variable impedance coupled to the balancing node, the method comprising:

a) setting the variable impedance to a first impedance setting;

b) transmitting a first transmit signal at a first transmit frequency in a first frequency band;

c) measuring a first signal at the output node at a first receive frequency in a second frequency band as a result of the signal transmitted at the first frequency;

d) selecting a second impedance setting of the variable impedance;

e) transmitting a second transmit signal at a second transmit frequency in the first frequency band;

f) measuring a second signal at the output node at a second receive frequency in the second frequency band as a result of the second signal transmitted at the second transmit frequency;

g) employing a system of equations comprising variables associating the first measured signal, the second measured signal, the first impedance setting, and the second impedance setting; and h) determining a third impedance setting to isolate the input node from the output node of the hybrid junction using the system of equations.

12. The method according to claim 11, wherein the first frequency band and the second frequency band do not overlap, overlap partially or overlap completely.

13. The method according to claim 11, wherein the first transmit frequency and the first receive frequency are identical or different.

14. The method according to claim 11, further comprising: for each measurement in operation c), calculating respective quantities representing interference and balance channels of the hybrid junction; and controlling the variable impedance as a function of the respective quantities.

15. The method according to claim 11, wherein the variable impedance is controlled such that a reflection coefficient at the balancing node is proportional to a mean reflection coefficient of the antenna over the first or second frequency band.

16. The method according to claim 11, wherein the variable impedance is controlled further as a function of at least one of a power density with which signals are transmitted by the antenna as a function of frequency, and a filter gain with which signals are received as a function of frequency.

17. The method according to claim 11, further comprising: setting the variable impedance to a further impedance setting; repeating operations b) and c) for the further impedance setting in order to obtaining another plurality of measurements; and controlling the variable impedance further as a function of the another plurality of measurements.

18. The method according to claim 11, further comprising carrying out operations a) to h) periodically.

19. The method according to claim 11, wherein the variable impedance is controlled to take an impedance proportional to $$\frac{1 + k\overline{\Gamma_{ANT}(\omega)}}{1 - k\overline{\Gamma_{ANT}(\omega)}},$$

where $\overline{\Gamma_{ANT}(\omega)}$ is the mean reflection coefficient of the antenna over the first or second frequency band, and where k is a constant of proportionality.

20. The apparatus according to claim 1, wherein the system of equations employed comprises variables associating the first measured signal, the second measured signal, the first impedance setting, and the second impedance setting, and the first transmitted signal and the second transmitted signal.

21. The device according to claim 10, wherein the system of equations employed comprises variables associating the first measured signal, the second measured signal, the first impedance setting, and the second impedance setting, and the first transmitted signal and the second transmitted signal.

22. The method according to claim 11, wherein the system of equations employed comprises variables associating the first measured signal, the second measured signal, the first impedance setting, and the second impedance setting, and the first transmitted signal and the second transmitted signal.

* * * * *